Feb. 13, 1968 T. C. WENZEL 3,368,220
WELDER'S MASK
Filed Oct. 21, 1965

INVENTOR.
THOMAS WENZEL
BY James C. Conner

AGENT.

United States Patent Office 3,368,220
Patented Feb. 13, 1968

3,368,220
WELDER'S MASK
Thomas C. Wenzel, 600 Woodbury Road,
Plainview, N.Y. 11803
Substituted for abandoned application Ser. No. 241,678,
Dec. 3, 1962. This application Oct. 21, 1965, Ser. No.
506,436
2 Claims. (Cl. 2—8)

ABSTRACT OF THE DISCLOSURE

A welder's mask having a hinged light-filtering window movable between operative and inoperative positions to respectively shield the welder's eyes from intense radiation and to permit him to view and set up the work prior to striking the arc, the window being movable under an automatic control so that when the head of the welder is nodded to effect a slight attitude change the window is opened and closed automatically, with a wide-angle adjustment being provided in the form of a rotatably adjustable switch enabling the switch to be conditioned for operation at any angle of the welder's head.

---

Figure 1:
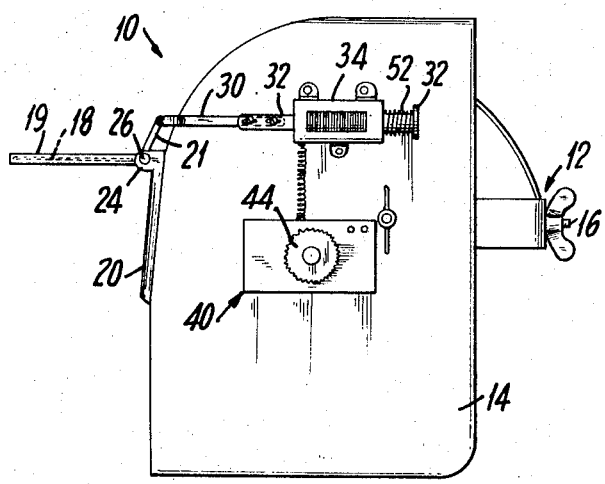

This invention relates generally to welding masks and in particular to welding masks having mechanized controls for operating the radiation filtering window.

Conventionally, welding masks comprise a headband portion upon which the mask pivots from an upward position permitting unobstructed vision to a face protecting downward position. The fixed welding glass or radiation filter is generally disposed in the portion of the mask adjacent to the eyes and, therefore, the opaque portion of the mask below the dark glass interrupts the wearer's vision as the mask moves from the upward position to the downward face-protecting position. This vision interruption is often one of the reasons for faulty welding and expensive damage or destruction of work pieces.

Heretofore, during welding operations, it was necessary to tilt the protective mask upwardly to inspect the weld. In welding or cutting with a torch or electrical arc instruments, it is the practice to substantially position the welding instrument in welding relation with the work before placing the mask in protecting relation. The mask is then positioned and the welding operation proceeds. Frequently during the welding operation, the welding instrument is removed from the work, the mask tilted back and a visual check made of the actual weld. Each visual check requires a repositioning of the welding instrument on the work and a replacement of the mask before the welding operation proceeds. The very nature of the protective filter or dark glass on the mask prevents accurate positioning of the instrument after the mask is placed in protecting position. The dark glass inhibits normal vision except when the weld is illuminated by the physical welding action. The interruption of vision by the positioning of the mask often results in the undesired movement of the inactive welding instrument without the welder's knowledge and accordingly a poor or incorrect weld results. Especially in welding operations on small work pieces, the potential movement of the welding instrument during the positioning of the mask can readily ruin or irreparably damage the work piece.

Techniques have been devised for automatic control of the radiation filter in welding masks. In some cases, it has been proposed to open the filtering glass or window without tilting the entire shield. In other cases, such as shown in U.S. Patent No. 2,423,320, it has been proposed to use Polaroid filters which are relatively movable to effect varying degrees of filtering as a function of light intensity. All of the known devices tend to be either overly complex or difficult to operate. A particularly troublesome problem in automatically operated welder's masks arises because welders must work in all positions and attitudes, even upside down. This alone renders many attitude-sensitive actuators for filters impractical.

Accordingly, it is one object of the present invention to provide an improved mechanically actuated filter control for welder's masks which enables a welder to operate in all positions and attitudes.

Another object of the invention is to provide an improved automatically controlled welder's mask in which the filter portion alone is movable under automatic control to expose the work to the direct line of sight of the welder while he is preparing to weld or while he is inspecting a previous weld, but which can be easily controlled without hand operations to interpose the radiation filter in the line of sight to protect the welder's eyes during the actual welding operation.

Figure 2:
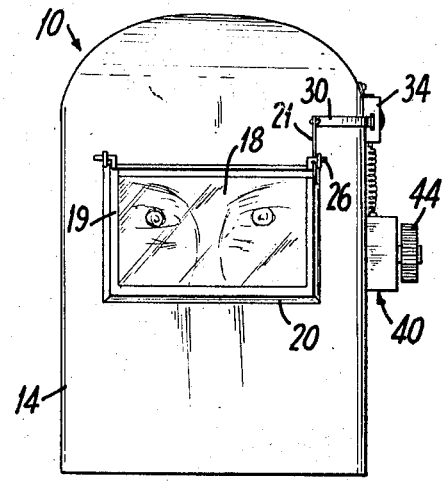
Figure 3:
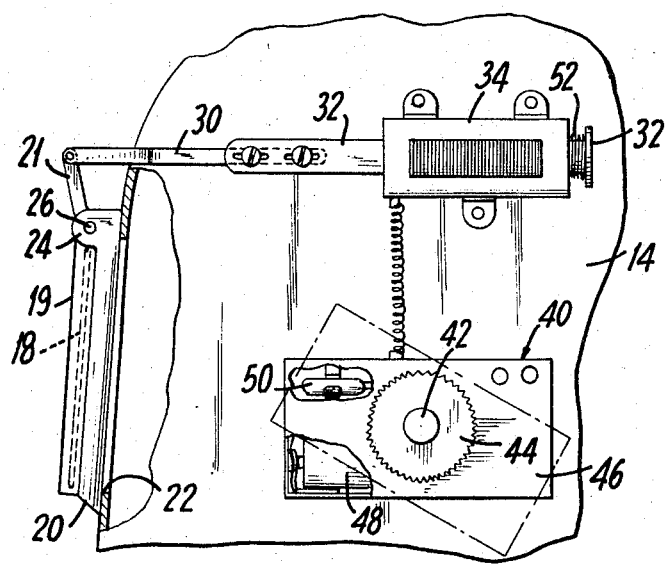
Figure 4:
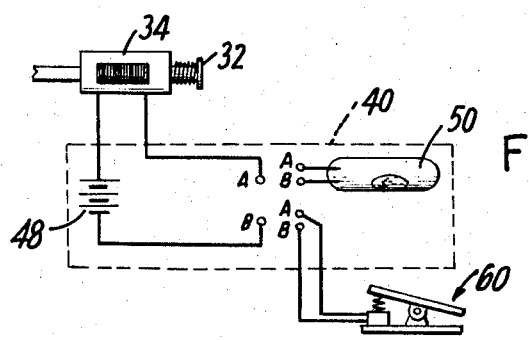

The above and other features of the invention will be apparent from the following specification describing a preferred embodiment of the invention, taken in conjunction with the accompanying drawing, in which:

FIGURE 1 is a side elevation of a welding mask incorporating the novel filter glass window controls, FIGURE 2 is a front elevation of the novel mask, and FIGURE 3 is a fragmentary side elevation of the window control with the window closed in welding relation.

Referring to the drawing in detail, 10 generally designates the mask having a conventional headband 12 and a face shield 14 pivotally mounted on a pair of oppositely extending studs 16 affixed to the headband 12 for convenient eye-level adjustment. The face shield 14 is generally preformed of a tough, light-gauge opaque laminated fiberboard that effectively covers the face and side portions of the head of a wearer to protect the head against flying debris created by the welding operation. Further, conveniently located in the mask 10 is a heat and glare-resistant glass window 18 that physically shields the eyes of the welder and filters out sight-damaging rays created by the welding process. Conventional prior masks were provided with fixed windows. In the present invention, the window 18 is pivotally mounted, as hereinafter described, to permit opening of the window for unobstructed vision through the port normally covered by the glass.

As shown in FIGURES 1, 2 and 3, a frame 20 is affixed to the shield 14 in peripheral relation with the port 22 formed in the forward eye-level portion of the shield. Projecting outwardly from the frame 20 are a pair of spaced arms 24 having coaxial studs 26 secured therein. Pivotally mounted on and disposed intermediate the studs 26 is a window frame 19 having glass 18 embedded therein. The window frame 19 is of such dimensions so as to overlie the port frame 20 in substantially overlapped closed relation. Projecting upwardly and forwardly from the pivotally mounted frame 19 is a fixed arm 21. Pivotally secured to the arm 21 is a link 30 which is in turn secured to the armature 32 of the solenoid 34 affixed to the outer periphery of the shield 14. A screw and slot coupling between the link 30 and the armature 32 is provided to adjust the path of travel of the armature necessary to pivot the arm 21 when the solenoid 34 is energized through a sufficient arc of rotation to move the glass 18 from a vertical port covering relation to a horizontal open port relation.

Means are provided to control the solenoid 34 to open and close the window glass 18 and directed toward this end is a unit 40 pivotally mounted on a stud 42 affixed to the outer periphery of shield 14. Unit 40 has a central aperture in which the threaded stud 42 resides. Unit 40 is substantially balanced on the stud 42 and may be rotated manually on said stud. A knob 44 threadedly tightened on the stud 42 secures unit 40 in any desired angle. The rotative feature of unit 40 is provided for reasons hereinafter apparent.

As shown in FIGURE 3, unit 40 comprises a casing 46 adapted to contain a battery 48 and a normally open mercury switch 50. The battery 48 is connected in a series circuit with the mercury switch 50 and the solenoid 34. Thus, closure of the mercury switch 50 will energize the solenoid 34 and close the window 18. The mercury switch 50 is of the horizontal angle type wherein a certain angle must be achieved before the mercury bridges the contacts therein. Such mercury switches are conventional and well-known to those skilled in the electrical art. It is sufficient to state that a forward or rearward tilting of the mask 10 with the unit 40 secured thereto will close the contacts in the mercury switch 50 and accordingly close the window 18 against the spring 52 on the armature of the solenoid 34. De-energization of the solenoid by the switch 50 will conversely open the window 18.

Thus, the angle of the switch 50 may be adjustable relative to the mask 10. Therefore, the relative positioning of the mask by a wearer's head movement will effectively control the opening and closing of the window glass 18 to provide uninterrupted vision of the welding operation during actual welding and the intermediate visual inspection periods. Thus, if the welder is operating in a position requiring him to look down at, say, a 45-degree angle at the work, he first adjusts the pivoted unit 40 to the desired work attitude or angle, i.e., so that the switch 50 is substantially level. He then proceeds with the welding operation using slight angular movements of his head to open and close the window frame 19 carrying the radiation filter. It will be understood that if the welder is operating on his side, he can effect control by turning his head slightly rather than tilting it. With relative ease the welder can learn to adjust the control unit 50 to accommodate all conceivable attitudes and angles of operation, and can proceed with complex and intricate welding operations without putting down the welding tools and manipulating his mask manually.

To assist in leveling the control unit 40 and hence the position-sensitive switch 50 theerein, it is preferred, in accordance with the invention, that the unit 40 be statically balanced about its pivoted axis 42. In this fashion, when the welder releases the lock nut 44, the unit 40 will tend to assume a horizontal position with minimum effort by the welder. Actuation of the solenoid will tell the welder when he is in the precisely operative area, after which he can set the unit 40 at the desired point slightly angularly spaced from the actuation and set the lock nut. Thereafter slight motion of his head can be used to control the radiation filtering window, all as set forth above.

While the invention has been described above having particular reference to a preferred embodiment thereof, it will be understood that it can take various other forms and arrangements without departing from the spirit of the invention. The invention should not, therefore, be regarded as limited except as defined in the following claims.

I claim:

1. In a welding mask having a protective face shield and a radiation filtering window for visually observing the work piece through the mask, electromagnetic means to move the window between operative and inoperative positions, a power source to energize said electromagnetic means responsive to slight angular movement of a magnitude related to a nod of the head; attitude responsive switch means to connect said power source to the electromagnetic means to control said window in accordance with the attitude of said face shield, and angularly adjustable means to mount the switch means on the face shield over a range of angular positions including a pivot axis extending laterally from the face shield to support the switch means for rotation about the axis for large angular distances to position the switch means for operation at all angular positions of the shield, whereby the welder can operate the window by limited attitude variations of the shield in any position, and releasable manually operated lock means to secure the switch means adjustably in any of its angular positions.

2. Apparatus as set forth in claim 1, said switch means being statically balanced about said axis to seek a horizontal position when released from said lock means.

References Cited

UNITED STATES PATENTS

| | | | |
|---|---|---|---|
| 2,036,224 | 4/1936 | Lincoln et al. | 2—8 X |
| 2,086,208 | 7/1937 | Brekelbaum | 2—8 |
| 2,196,543 | 4/1940 | Anderson. | |
| 2,423,320 | 7/1947 | Hurley | 2—8 |
| 2,678,369 | 5/1954 | Van Hook | 2—8 X |
| 3,096,430 | 7/1963 | Farr | 2—8 X |

JORDAN FRANKLIN, *Primary Examiner.*

JAMES R. BOLER, *Examiner.*